(12) United States Patent
Achtner et al.

(10) Patent No.: US 7,016,120 B2
(45) Date of Patent: Mar. 21, 2006

(54) OBJECTIVE AND FAMILY OF OBJECTIVES

(75) Inventors: Bertram Achtner, Schwäbisch Gmünd (DE); Jürgen Noffke, Aalen (DE); Dietmar Gängler, Langenau (DE); Elke Schmidt, Ismaning (DE); Bo Möller, Kalmar (SE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/406,210

(22) Filed: Apr. 4, 2003

(65) Prior Publication Data

US 2003/0189767 A1    Oct. 9, 2003

(30) Foreign Application Priority Data

Apr. 8, 2002    (DE)    ................. 102 15 434

(51) Int. Cl.
 *G02B 15/14*    (2006.01)

(52) U.S. Cl. ....................... 359/684; 359/680

(58) Field of Classification Search ........ 359/642–797; 396/89–152, 451, 458–462, 505–510
See application file for complete search history.

(56) References Cited

U.S. PATENT DOCUMENTS

| | | | | |
|---|---|---|---|---|
| 4,789,227 A | * | 12/1988 | Tanaka et al. | ............... 359/684 |
| 5,159,493 A | | 10/1992 | Tsutsumi | |
| 5,321,554 A | * | 6/1994 | Ishiyama et al. | ........... 359/753 |
| 5,805,349 A | * | 9/1998 | Sato | ........................ 359/682 |
| 6,115,188 A | * | 9/2000 | Nishio et al. | ............... 359/690 |
| 6,122,111 A | * | 9/2000 | Neil et al. | .................. 359/689 |
| 6,342,974 B1 | * | 1/2002 | Usui | ......................... 359/687 |

FOREIGN PATENT DOCUMENTS

| | | |
|---|---|---|
| DE | 2 323 377 | 11/1973 |
| EP | 0 841 583 | 5/1998 |
| WO | WO 00/30348 | 5/2000 |

OTHER PUBLICATIONS http://www.fujinon.co.jp/news/010515.htm. Fujinon Introduces New Products of "Cine-style Lens Series" for HDTV Cine Cameras, 2001, Fuji Photo Optical Co., Ltd.

"The Photographic Lens" by Sidney F. Ray, 1979, Focal Press, London. pp. 86-89.

"Bauelemente der Optik, Taschenbuch der technischen Optik", by Naumann et al, Carl Hanser Verlag München Wien, pp. 388-389.

* cited by examiner

*Primary Examiner*—Georgia Epps
*Assistant Examiner*—M. Hasan
(74) *Attorney, Agent, or Firm*—Walter Ottesen

(57) ABSTRACT

An objective has a front group, a focus group displaceable along the optical axis and a follow-on lens group having a diaphragm. The front group is arranged at the objective end. The lens group having the diaphragm includes at least two composite lenses and/or two positive lenses and/or the back focus can be adjusted. An objective series is presented wherein all objectives of the series have a uniform appearance and/or the diaphragm is arranged in all objectives proceeding from the image plane at the same location.

25 Claims, 5 Drawing Sheets

41.67 MM

OBJECTIVE AND FAMILY OF OBJECTIVES

FIELD OF THE INVENTION

The invention relates to objectives including the following: an objective having a front group arranged at the objective end; a focus group displaceable along the optical axis; and, a follow-on lens group having a diaphragm. These objectives are especially suited for high definition television (HDTV) applications.

BACKGROUND OF THE INVENTION

In the text of Naumann et al entitled "Bauelemente der Optik", sixth edition, page 388, a photo objective is disclosed which includes a front group, an axially-displaceable focus group and a lens group having a diaphragm.

HDTV objectives are known from the Fujinon Company which were introduced in April 2000 and have been on sale in the marketplace since July 2001 under the internet address: http://www.fujinon.co.jp/news/010515.htm.

U.S. Pat. No. 6,556,354 discloses an adapter for coupling photo objectives to a video camera. This adapter is provided for use in HDTV and this can be noted in that a prism arrangement is provided for the spectral separation into the individual color channels. A high-quality recordation is achieved with this separation into the individual color channels.

European patent publication 0,841,583 discloses an optical adapter with which the use of objectives is made possible in an electronic camera. The separation into individual color channels is also provided in this adapter.

SUMMARY OF THE INVENTION

It is an object of the invention to reduce the manufacturing costs for objectives or for a series of objectives which are suitable for use with HDTV. It is another object of the invention to simplify the handling of the different objectives of an objective series.

The objective defining an optical axis of the invention includes: a front group; a focus group displaceable along the optical axis; and, a lens group incorporating a diaphragm. The lens group is mounted adjacent the focus group and includes at least two composite lenses.

The optical characteristics can be improved by providing at least two composite lenses in the lens group having the diaphragm. The optical characteristics are especially improved in that the chromatic aberrations are reduced. High requirements are imposed on objectives which are intended to be used in HDTV cameras and these high requirements include: the resolution, a minimal chromatic aberration, an image end telecentric chief array path, a low aperture number and a low brightness fall off.

A positive effect on the optical characteristics of the objective can be achieved with the measure of providing two individual lenses of positive refractive power at the image end in the lens group including the diaphragm.

For the use of objectives with HDTV cameras, it has been shown to be advantageous to provide a back focus via which an adaptation of the focal intercept is made possible to the particular camera. In this way, the objectives can be adapted to various cameras of different manufacturers. With this back focus, tolerances can be compensated which occur at the focal intercept of the camera to the objective. In this way, an avoidance of a defocusing can be ensured which would otherwise lead to a very substantial quality loss. To make available the back focus, it is provided that the lenses of the objective in their entirety are displaceably mounted in the axial direction, preferably by at least ±0.2 mm.

Furthermore, it has been shown to be advantageous to provide at least one lens of a composite lens made of glass having an abnormal dispersion such as fluor crown or phosphate crown.

The manufacturing costs can be reduced with the measure to mount the diaphragm in all objectives in an objective series at an identical position in the objective with reference to the image plane.

Furthermore, it has been shown to be advantageous in a series of objectives to use the same diaphragm in all objectives and to adapt only their maximum or minimum diameter from objective to objective. This saves the development of several diaphragms and affords advantages in the objective assembly.

It has also been shown to be advantageous that all objectives of the objective series have the same structural length. This has advantages especially with respect to manufacturing costs.

It has been shown to be further advantageous in the objectives of an objective series to arrange actuating elements in all objectives at the same location. In this way, the handling for the user is significantly simplified. The holding position for actuating an actuating element, such as the focusing, is the same in all objectives of the objective series of the invention.

It has also been shown to be advantageous that all objectives of the objective series have an exit pupil position of more than 500 mm from the image plane for the realization of a telecentric chief beam path.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
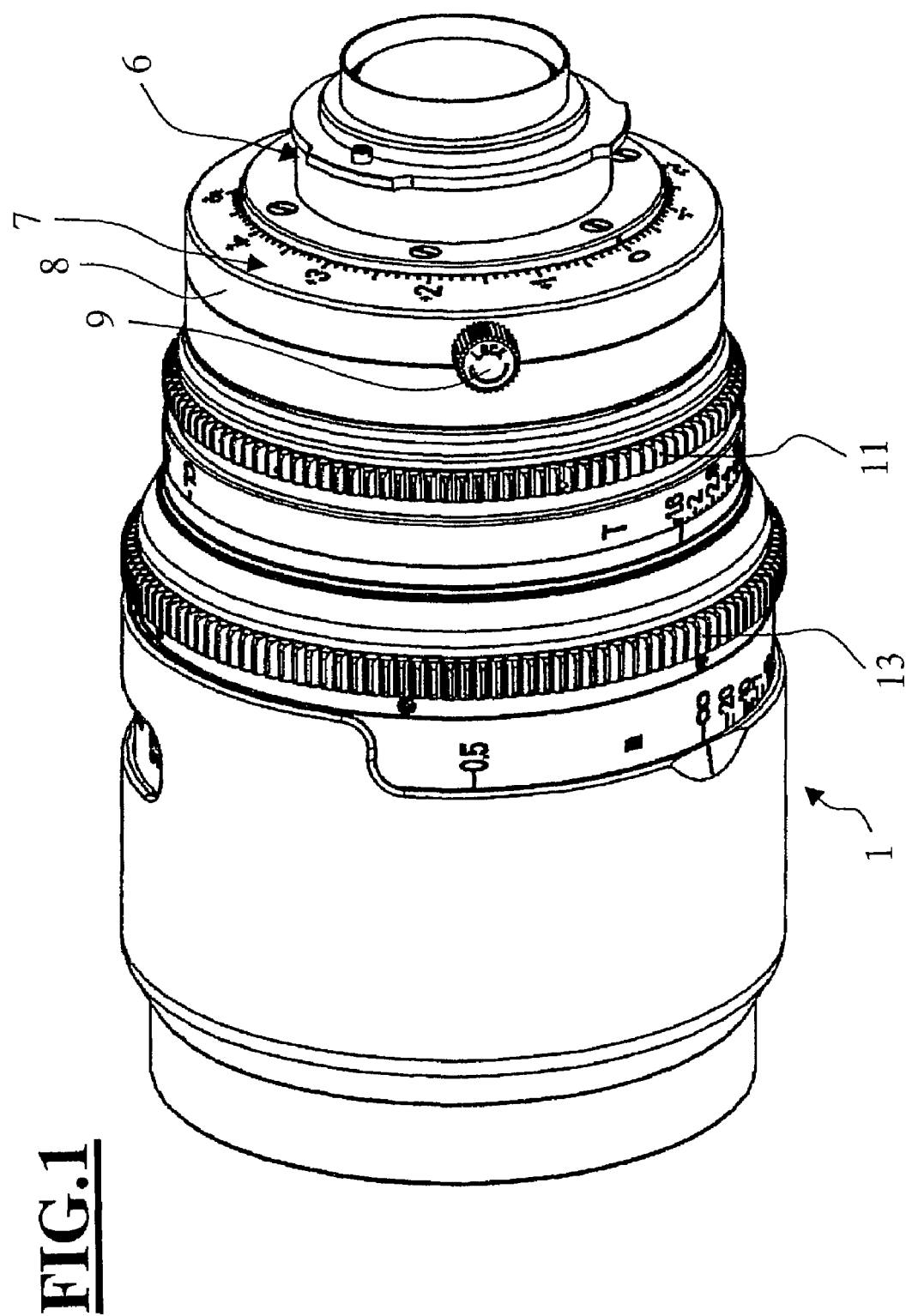
FIG. 1 is a perspective view of the objectives of a series of objectives.
Figure 2:
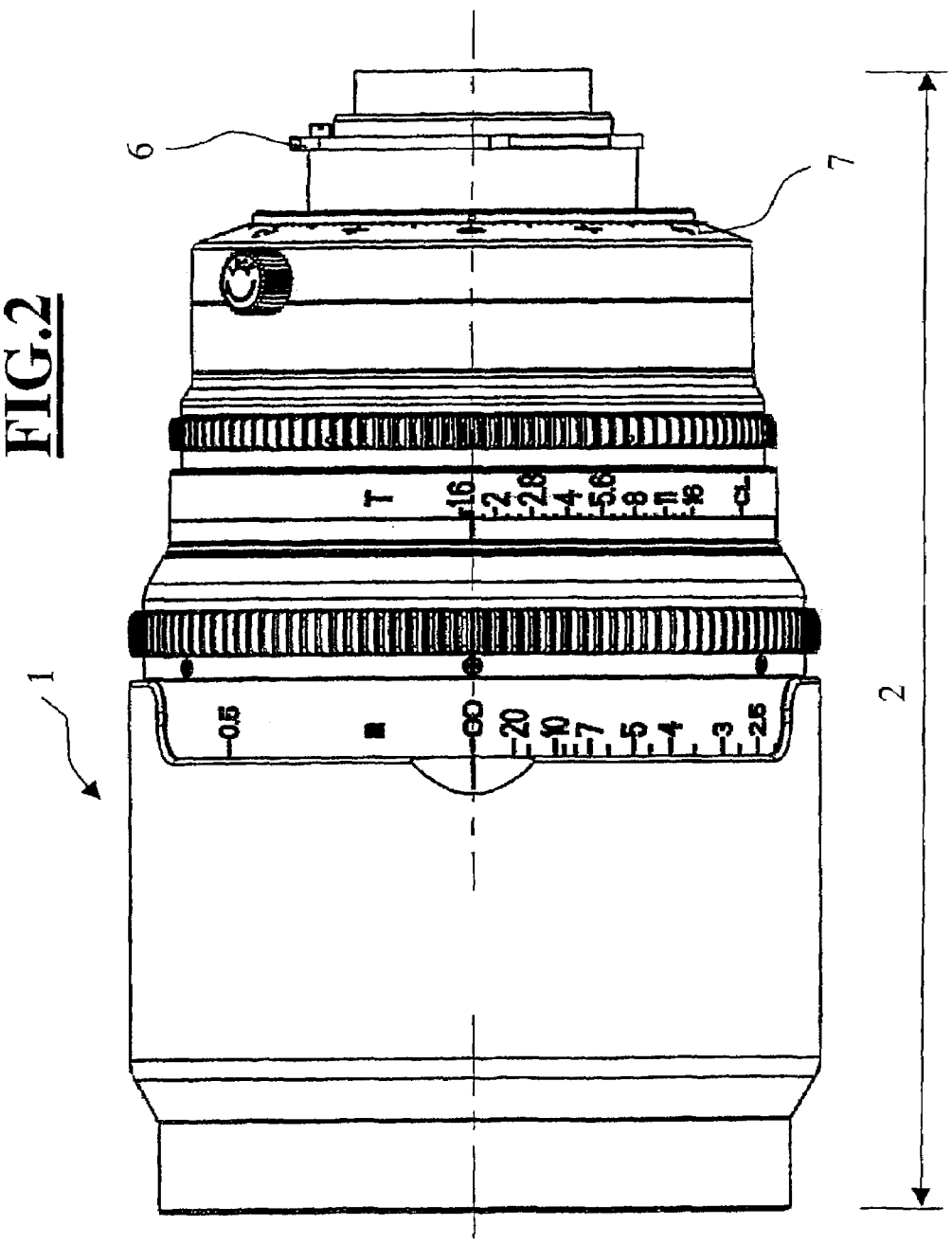
FIG. 2 is a side elevation view of an objective of a series of objectives.

The configuration of an objective of an objective series is shown by way of example in FIGS. 1 and 2. The objective 1 includes a unitary structural length 2 for all objectives in an objective series. At the camera end, the objective is provided with a connecting element 6 via which the objective can be fixedly connected to the camera. The objective is provided with a scale 7 at the end thereof facing toward the camera. The adjusted back focus is displayed by the scale 7.

A rotating ring 8 is provided for adjusting the back focus. A rotating knob 9 is provided for latching the adjusted back focus. The rotating knob 9 must be loosened in order to carry out an adjustment of the back focus by means of the rotating ring 8.

The rotating ring 11 is provided for adjusting the diaphragm. The rotating ring 13 is provided for focusing.

An objective series will now be explained with respect to the lens sections shown in FIGS. 3 to 9.

Figure 3:
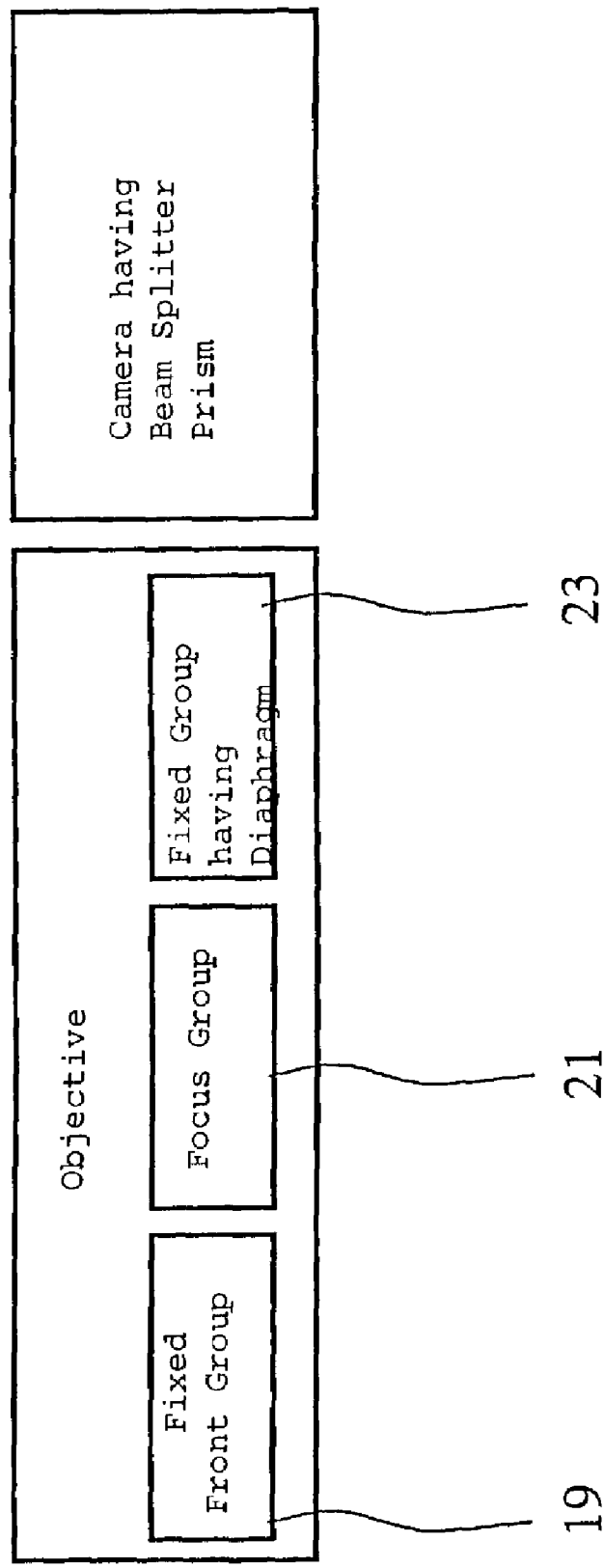
FIG. 3 is a schematic representation of the configuration of a lens arrangement of the objective.

All objectives are of the retrofocus type, that is, their focal intercept is greater than their focal length. This is attributed to the special configuration of HDTV cameras which use a beam splitter prism for color separation and therefore require a correspondingly large image end focal intercept. The structural configuration is shown in FIG. 3. As shown in FIG. 3, the objective includes: a front group mounted at the object end with the front group being fixedly mounted; a focus group 21 which is arranged so as to be displaceable along the optical axis of the objective; and, a lens group 23, which is provided with a diaphragm 25, to which the camera with the beam splitter prism 5 borders for separating the image into various color channels. By providing an inner focusing, it is possible that all objectives have a unitary and constant structural length.

In the illustrated embodiments, the structural configuration of the lens group 23 is identical insofar that this lens group has two composite lenses in each case and wherein the last two lenses, which are mounted forward of the beam splitter prism 5, are individual lenses having a positive refractive power. The diaphragm 25 is mounted in the lens group 23. Tooling costs are saved because of the similar configuration of the lens group 23 having diaphragm 25. Furthermore, the assembly of the objective is simplified thereby.

In the embodiments, examples are given for a modular group behind the diaphragm for the wide angle range. The modular configuration can be recognized in that a lens group of negative refractive power is constructed on a pregiven lens group of positive refractive power so that a new objective having another focal length is provided. With this method, it is especially possible to rationally develop a series of objectives having different focal lengths which manifests itself advantageously with respect to development costs.

All illustrated objectives are virtually limited in the green channel with respect to diffraction. All objective sets have a uniformly high image quality, that is, no power drop occurs when changing an objective. The TV distortion is less than 1% for all objectives. The TV distortion, TVV, is computed as follows:

$$TVV = 50 \frac{V_{diagonal} - V_{longitudinal}}{(1+V_{diagonal})(1+V_{longitudinal})},$$

wherein:

$V_{diagonal}$ is the distortion along the image diagonal; and,
$V_{longitudinal}$ is the distortion along the image longitudinal end.

The distortion is computed as follows:

$$V_x = \frac{y_{paraxial} - y_x}{y_{paraxial}}$$

wherein:

$y_{paraxial}$ is the paraxial image height; and,
$y_x$ is the real image height diagonally or longitudinally.

The focal length changes, in general, when focusing because of the internal focusing. In this way, the imaging scale also changes and the image appears to expand or collapse when focusing. This is characterized as image angle change or pumping and is computed in accordance with the formula:

$$P = 100 \frac{\tan(w_i) - \tan(w_n)}{\tan(w_i)}$$

wherein:

$w_i$ is the image angle for the focus position at infinity; and,
$w_n$ is the image angle for the close-up focusing position.

In all objectives, pumping is less than 2% in the focusing range from infinity to the shortest close-up limit (object to image distance OO'=0.5 m).

All objectives have a telecentric chief beam path which is realized by an exit pupil position which is larger than 500 mm from the image plane.

All objectives have a back focus which permits an adaptation of the focal intercept to the particular camera. A back focus is necessary because the focal intercept of the camera to the objective has too large a tolerance and a defocusing caused thereby would lead to a very significant loss of quality.

All objectives have a uniform diaphragm position, that is, the distance of the diaphragm to the image plane is the same. In all objectives of the series, the same diaphragm can be used. Only the maximum or minimum diameter of the diaphragm 25 has to be adapted from objective to objective because of the different entry pupil radii. This saves the development of several diaphragms and affords advantages in the assembly of the objective.

Figure 4:
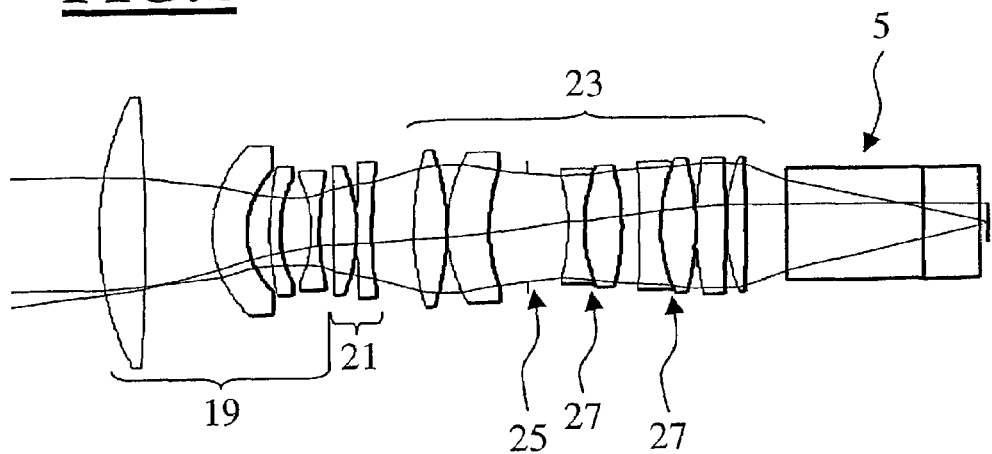
FIG. 4 is a schematic lens section view of an objective having a focal length of 39.84 mm.

The lens data of the lens section shown in FIG. 4 is set forth in Table 1.

TABLE 1

Example 1
Focal length: 39.84 Stop Aperture Surface: 18
Focus group: Surface 10 . . . 13

| No. | Radius | Distance | nd | vd |
|---|---|---|---|---|
| 1 | INFINITY | 0.000 | | |
| 2 | 73.91800 | 11.000 | 1.55235 | 63.46 |
| 3 | −510.28000 | 16.000 | | |
| 4 | 27.98200 | 8.500 | 1.84676 | 23.83 |
| 5 | 20.68400 | 5.360 | | |
| 6 | 74.98900 | 2.400 | 1.62299 | 58.02 |
| 7 | 29.42700 | 7.300 | | |
| 8 | −29.64000 | 2.000 | 1.74402 | 44.85 |
| 9 | 62.64300 | 3.410 | | |
| 10 | INFINITY | 5.500 | 1.49702 | 81.54 |
| 11 | −41.26900 | 0.100 | | |
| 12 | 334.97000 | 3.500 | 1.74956 | 34.82 |
| 13 | 109.02000 | 9.954 | | |
| 14 | 67.31700 | 8.000 | 1.49702 | 81.54 |
| 15 | −58.71500 | 0.100 | | |
| 16 | 35.73800 | 10.000 | 1.80819 | 22.76 |
| 17 | 45.64300 | 9.000 | | |
| 18 | INFINITY | 9.700 | | |
| 19 | −48.00100 | 3.800 | 1.74956 | 35.28 |
| 20 | 38.40400 | 9.000 | 1.49702 | 81.54 |
| 21 | −57.04900 | 4.200 | | |
| 22 | −258.52000 | 5.000 | 1.72053 | 34.71 |
| 23 | 39.81100 | 8.500 | 1.49702 | 81.54 |

TABLE 1-continued

Example 1
Focal length: 39.84 Stop Aperture Surface: 18
Focus group: Surface 10 ... 13

| No. | Radius | Distance | nd | vd |
|---|---|---|---|---|
| 24 | −59.56600 | 0.100 | | |
| 25 | 93.72900 | 7.000 | 1.60314 | 60.64 |
| 26 | −244.06000 | 0.100 | | |
| 27 | 45.64300 | 4.500 | 1.76206 | 40.10 |
| 28 | −381.29000 | 2.138 | | |
| 29 | INFINITY | 7.600 | | |
| 30 | INFINITY | 33.000 | 1.60863 | 46.44 |
| 31 | INFINITY | 13.200 | 1.51682 | 64.17 |
| 32 | INFINITY | 0.860 | | |
| 33 | INFINITY | 1.000 | | |
| 34 | INFINITY | 0.000 | | |

The focal length of the objective is 39.84 mm. The first lens surface arranged at the object end is the surface number 2 and the fifth and sixth lenses in the propagation direction of the light have the surfaces 10 to 13 and are mounted to be displaceable along the optical axis of the objective. The focus group 21 is formed by these lenses. Reference numeral 27 identifies the composite lens of the lens group 23 having diaphragm 25. Reference numeral 5 identifies the prism arrangement of the HDTV camera.

Figure 5:
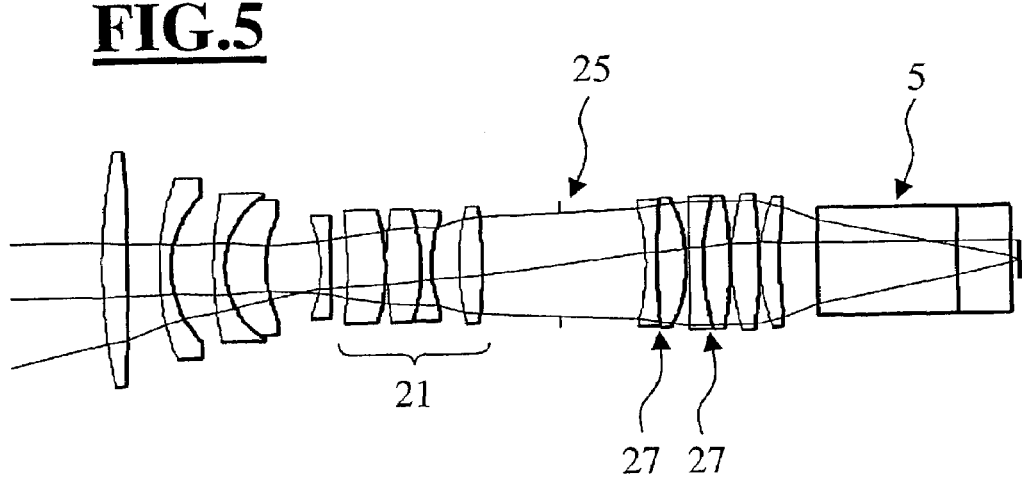
FIG. 5 is a schematic lens section view of an objective having a focal length of 20.1 mm.

The lens data of the lens section of an objective shown in FIG. 5 is set forth in Table 2.

TABLE 2

Example 2
Focal Width: 20.10 Stop Aperture Surface: 18
Focus group: Surfaces 11 ... 17

| No. | Radius | Distance | nd | vd |
|---|---|---|---|---|
| 1 | INFINITY | 0.000 | | |
| 2 | 139.24000 | 6.300 | 1.69104 | 54.71 |
| 3 | −530.88000 | 7.500 | | |
| 4 | 60.86600 | 2.800 | 1.54817 | 45.85 |
| 5 | 25.66700 | 10.000 | | |
| 6 | 82.34300 | 2.750 | 1.48751 | 70.40 |
| 7 | 20.38800 | 10.000 | 1.80527 | 25.36 |
| 8 | 30.50500 | 12.830 | | |
| 9 | −29.85400 | 2.600 | 1.80527 | 25.43 |
| 10 | −392.42000 | 4.002 | | |
| 11 | −83.53600 | 8.950 | 1.48751 | 70.40 |
| 12 | −47.65700 | 0.250 | | |
| 13 | 87.85200 | 8.200 | 1.71304 | 53.83 |
| 14 | −49.40300 | 2.600 | 1.67277 | 32.25 |
| 15 | 33.49700 | 6.630 | | |
| 16 | 57.46100 | 5.500 | 1.78481 | 25.76 |
| 17 | −128.64000 | 18.588 | | |
| 18 | INFINITY | 20.390 | | |
| 19 | −51.95500 | 2.600 | 1.69104 | 54.71 |
| 20 | 165.48000 | 7.000 | 1.49702 | 81.54 |
| 21 | −35.22700 | 0.800 | | |
| 22 | 1295.70000 | 3.300 | 1.74956 | 34.95 |
| 23 | 52.70800 | 6.400 | 1.49702 | 81.54 |
| 24 | −89.12500 | 0.300 | | |
| 25 | 58.29400 | 6.400 | 1.49702 | 81.54 |
| 26 | −137.25000 | 0.150 | | |
| 27 | 37.31400 | 5.000 | 1.51682 | 64.17 |
| 28 | 139.24000 | 1.700 | | |
| 29 | INFINITY | 7.600 | | |
| 30 | INFINITY | 33.000 | 1.60863 | 46.44 |
| 31 | INFINITY | 13.200 | 1.51682 | 64.17 |
| 32 | INFINITY | 0.860 | | |
| 33 | INFINITY | 1.000 | | |
| 34 | INFINITY | 0.000 | | |

This objective includes a focal length of 20.1 mm. The first lens surface, which is arranged at the object end, is the lens surface number 2. The front group 19 is formed by the first five lenses arranged at the object end. The focus group 21 is formed by the lenses 6 to 9 following the front group. The lens group 23 having the diaphragm 25 is formed by the lenses, which are arranged after the diaphragm, together with the diaphragm. This last lens group 23 has a focal length of 37.61 mm.

Figure 6:
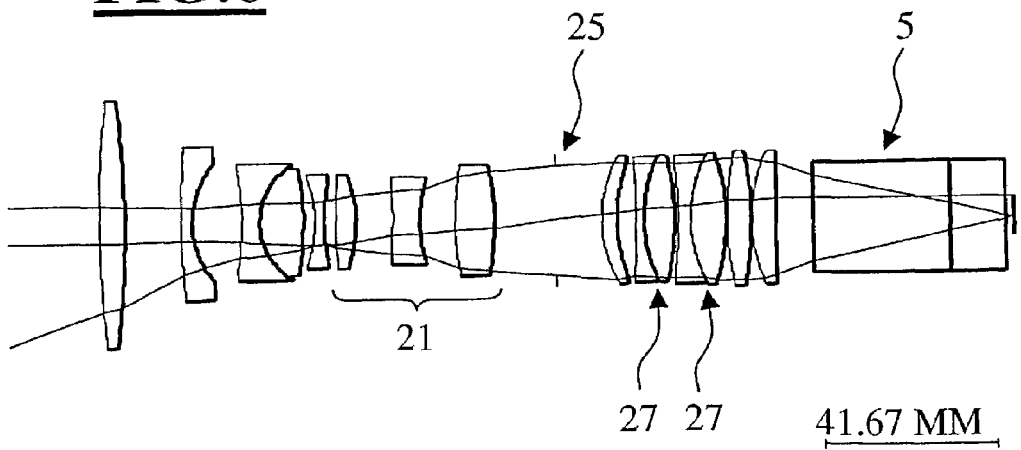
FIG. 6 is a schematic lens section view of an objective having a focal length of 13.98 mm.

The lens data of the lens section shown in FIG. 6 is set in Table 3.

TABLE 3

Example 3
Focal Width: 13.98 Stop Aperture Surface: 17
Focus group: Surfaces 11 ... 16

| No. | Radius | Distance | nd | vd |
|---|---|---|---|---|
| 1 | INFINITY | 0.000 | | |
| 2 | 247.60000 | 6.240 | 1.71304 | 53.83 |
| 3 | −247.60000 | 13.350 | | |
| 4 | 205.35000 | 2.700 | 1.49702 | 81.54 |
| 5 | 22.06700 | 12.200 | | |
| 6 | −64.93800 | 4.100 | 1.49702 | 81.54 |
| 7 | 16.43000 | 10.250 | 1.67276 | 32.21 |
| 8 | −66.35500 | 2.820 | | |
| 9 | −28.59200 | 2.400 | 1.80819 | 22.76 |
| 10 | 60.43000 | 2.877 | | |
| 11 | 403.88000 | 4.600 | 1.48751 | 70.40 |
| 12 | −32.78100 | 8.770 | | |
| 13 | −211.35000 | 6.500 | 1.80617 | 33.27 |
| 14 | 35.99600 | 8.550 | | |
| 15 | 77.73600 | 9.300 | 1.75528 | 27.58 |
| 16 | −64.93800 | 14.523 | | |
| 17 | INFINITY | 11.220 | | |
| 18 | 32.31300 | 3.500 | 1.80819 | 22.76 |
| 19 | 38.68100 | 4.450 | | |
| 20 | −330.18000 | 2.000 | 1.62044 | 60.32 |
| 21 | 36.51700 | 7.340 | 1.49702 | 81.54 |
| 22 | −63.55100 | 0.940 | | |
| 23 | −97.17100 | 3.000 | 1.80106 | 34.97 |
| 24 | 34.84300 | 8.250 | 1.49702 | 81.54 |
| 25 | −52.70800 | 0.200 | | |
| 26 | 71.30600 | 5.750 | 1.49702 | 81.54 |
| 27 | −82.93700 | 0.200 | | |
| 28 | 38.40400 | 6.050 | 1.49702 | 81.54 |
| 29 | −562.34000 | 1.140 | | |
| 30 | INFINITY | 7.600 | | |
| 31 | INFINITY | 33.000 | 1.60863 | 46.44 |
| 32 | INFINITY | 13.200 | 1.51682 | 64.17 |
| 33 | INFINITY | 0.860 | | |
| 34 | INFINITY | 1.000 | | |
| 35 | INFINITY | 0.000 | | |

In this embodiment, the focus group 21 includes three lenses. The focus range 21 of this objective extends from 0.5 m to infinity.

Figure 7:
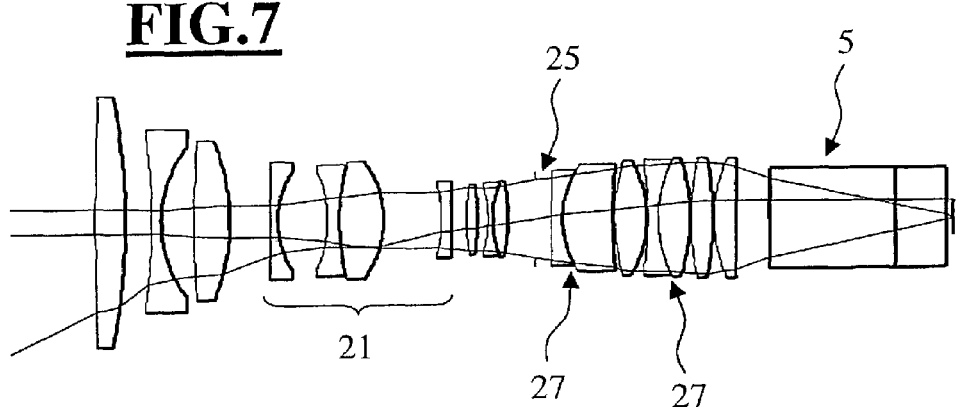
FIG. 7 is a schematic lens section view of an objective having a focal length of 10.01 mm.

The lens data for the lens section shown in FIG. 7 is set forth in Table 4.

TABLE 4

Example 4
Focal Width: 10.01 Stop Aperture Surface: 20
Focus group: Surfaces 8 ... 14

| No. | Radius | Distance | nd | vd |
|---|---|---|---|---|
| 1 | INFINITY | 0.000 | | |
| 2 | 937.29000 | 8.000 | 1.74402 | 44.85 |
| 3 | −177.83000 | 7.080 | | |
| 4 | −167.88000 | 2.500 | 1.83411 | 37.30 |
| 5 | 32.78100 | 8.760 | | |
| 6 | 269.93000 | 9.500 | 1.83507 | 43.13 |
| 7 | −56.23400 | 10.772 | | |
| 8 | 2585.20000 | 2.100 | 1.56909 | 71.22 |
| 9 | 24.76000 | 13.000 | | |

TABLE 4-continued

Example 4
Focal Width: 10.01 Stop Aperture Surface: 20
Focus group: Surfaces 8 ... 14

| No. | Radius | Distance | nd | vd |
|---|---|---|---|---|
| 10 | −31.85100 | 3.100 | 1.61803 | 63.33 |
| 11 | 60.86600 | 11.600 | 1.74104 | 52.64 |
| 12 | −27.78100 | 15.400 | | |
| 13 | −30.94700 | 2.600 | 1.61803 | 63.33 |
| 14 | −349.74000 | 3.868 | | |
| 15 | 60.86600 | 2.800 | 1.74956 | 34.95 |
| 16 | −68.78600 | 2.940 | | |
| 17 | −26.99300 | 1.200 | 1.83507 | 43.13 |
| 18 | 28.18400 | 4.000 | 1.62009 | 36.37 |
| 19 | −45.97300 | 7.070 | | |
| 20 | INFINITY | 4.500 | | |
| 21 | −275.82000 | 2.700 | 1.83507 | 43.13 |
| 22 | 24.76000 | 13.200 | 1.75528 | 27.58 |
| 23 | 131.45000 | 0.560 | | |
| 24 | 54.63900 | 8.300 | 1.48751 | 70.40 |
| 25 | −32.54600 | 0.200 | | |
| 26 | −97.16300 | 3.000 | 1.80106 | 34.97 |
| 27 | 34.84300 | 8.250 | 1.49702 | 81.54 |
| 28 | −52.70800 | 0.200 | | |
| 29 | 71.30600 | 5.750 | 1.49702 | 81.54 |
| 30 | −82.93700 | 0.200 | | |
| 31 | 38.40400 | 6.050 | 1.49702 | 81.54 |
| 32 | −562.34000 | 1.140 | | |
| 33 | INFINITY | 7.600 | | |
| 34 | INFINITY | 33.000 | 1.60863 | 46.44 |
| 35 | INFINITY | 13.200 | 1.51682 | 64.17 |
| 36 | INFINITY | 0.860 | | |
| 37 | INFINITY | 1.000 | | |
| 38 | INFINITY | 0.000 | | |

In this objective, the front group 19 is formed by the first three lenses mounted at the object end. The focus group 21 is formed by the following lenses and the lens group having diaphragm 18 follows the focus group 21.

Figure 8:
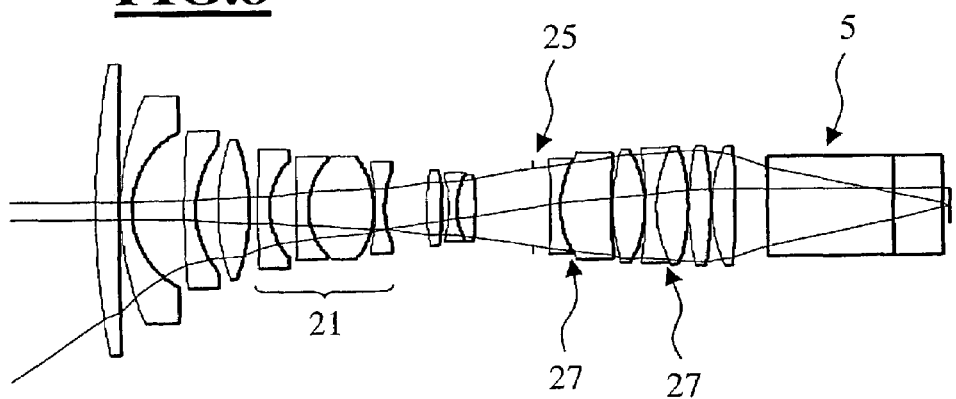
FIG. 8 is a schematic lens section view of an objective having a focal length of 7.05 mm; and, FIG. 9 is a schematic lens section view of an objective having a focal length of 5.2 mm.

The lens data for the lens section shown in FIG. 8 is set forth in Table 5.

TABLE 5

Example 5
Focal Width: 7.05 Stop Aperture Surface: 25
Focus group: Surfaces 10 ... 17

| No. | Radius | Distance | nd | vd |
|---|---|---|---|---|
| 1 | INFINITY | 0.000 | | |
| 2 | 199.53000 | 6.300 | 1.72007 | 50.62 |
| 3 | 2660.70000 | 0.350 | | |
| 4 | 74.98900 | 3.000 | 1.49702 | 81.54 |
| 5 | 23.54400 | 14.000 | | |
| 6 | 258.52000 | 3.000 | 1.80819 | 22.76 |
| 7 | 26.79900 | 6.050 | | |
| 8 | 57.46100 | 8.400 | 1.71743 | 29.51 |
| 9 | −57.46100 | 2.408 | | |
| 10 | INFINITY | 0.000 | | |
| 11 | 307.26000 | 3.000 | 1.49702 | 81.54 |
| 12 | 19.38700 | 7.000 | | |
| 13 | −1412.50000 | 3.000 | 1.49702 | 81.54 |
| 14 | 18.17100 | 17.400 | 1.51115 | 60.41 |
| 15 | −23.04100 | 0.400 | | |
| 16 | −50.48100 | 2.500 | 1.49702 | 81.54 |
| 17 | 27.38400 | 4.092 | | |
| 18 | INFINITY | 0.000 | | |
| 19 | INFINITY | 7.000 | | |
| 20 | 55.03300 | 4.150 | 1.64774 | 33.85 |
| 21 | −55.03300 | 1.650 | | |
| 22 | −33.98200 | 2.000 | 1.80425 | 46.50 |
| 23 | 18.70100 | 5.000 | 1.60347 | 38.03 |
| 24 | −74.45200 | 15.200 | | |
| 25 | INFINITY | 0.000 | | |

TABLE 5-continued

Example 5
Focal Width: 7.05 Stop Aperture Surface: 25
Focus group: Surfaces 10 ... 17

| No. | Radius | Distance | nd | vd |
|---|---|---|---|---|
| 26 | INFINITY | 4.500 | | |
| 27 | −275.82000 | 2.700 | 1.83507 | 43.13 |
| 28 | 24.76000 | 13.200 | 1.75528 | 27.58 |
| 29 | 131.45000 | 0.560 | | |
| 30 | 54.63900 | 8.300 | 1.48751 | 70.40 |
| 31 | −32.54600 | 0.200 | | |
| 32 | −97.16300 | 3.000 | 1.80106 | 34.97 |
| 33 | 34.84300 | 8.250 | 1.49702 | 81.54 |
| 34 | −52.70800 | 0.200 | | |
| 35 | 71.30600 | 5.750 | 1.49702 | 81.54 |
| 36 | −82.93700 | 0.200 | | |
| 37 | 38.40400 | 6.050 | 1.49702 | 81.54 |
| 38 | −562.34000 | 1.140 | | |
| 39 | INFINITY | 7.600 | | |
| 40 | INFINITY | 33.000 | 1.60863 | 46.44 |
| 41 | INFINITY | 13.200 | 1.51682 | 64.17 |
| 42 | INFINITY | 0.860 | | |
| 43 | INFINITY | 1.000 | | |
| 44 | INFINITY | 0.000 | | |

In this objective, the front group 19 is formed by the first four lenses arranged at the object end. The next lenses are arranged to be displaceable axially along the optical axis of the objective and thereby form the focus group 21. The lenses which follow define the lens group 23 having the diaphragm 25.

Figure 9:
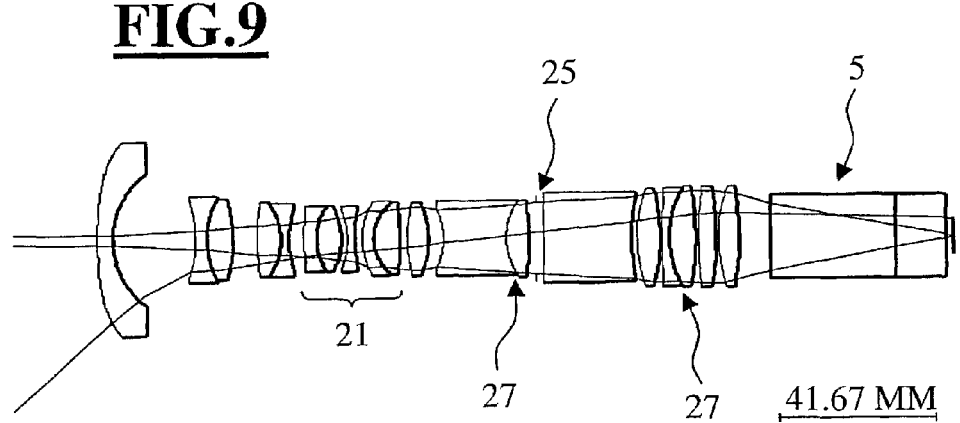

The lens data to the lens section shown in FIG. 9 are set forth in Table 6.

TABLE 6

Example 6
Focal Width: 5.20 Stop Aperture Surface: 23
Focus group: Surfaces 10 ... 17

| No. | Radius | Distance | nd | vd |
|---|---|---|---|---|
| 1 | INFINITY | 0.000 | | |
| 2 | 147.30000 | 4.000 | 1.74402 | 44.85 |
| 3 | 22.06700 | 22.190 | | |
| 4 | −33.01800 | 3.000 | 1.88306 | 40.76 |
| 5 | 22.06700 | 7.000 | 1.54817 | 45.85 |
| 6 | −40.09800 | 6.550 | | |
| 7 | 50.11900 | 6.300 | 1.54817 | 45.85 |
| 8 | −17.27800 | 2.000 | 1.49702 | 81.63 |
| 9 | 22.38700 | 4.066 | | |
| 10 | 91.07000 | 3.200 | 1.88306 | 40.76 |
| 11 | 14.33000 | 6.700 | 1.59275 | 35.31 |
| 12 | −18.70100 | 1.520 | | |
| 13 | −22.87600 | 2.000 | 1.88306 | 40.76 |
| 14 | 36.51700 | 2.020 | | |
| 15 | 19.38700 | 3.000 | 1.92300 | 18.90 |
| 16 | 12.23200 | 6.850 | 1.63985 | 34.47 |
| 17 | −101.08000 | 1.924 | | |
| 18 | 36.51700 | 5.700 | 1.65416 | 39.63 |
| 19 | −24.23100 | 4.030 | | |
| 20 | −17.65500 | 16.600 | 1.78595 | 44.20 |
| 21 | 17.91100 | 5.700 | 1.75528 | 27.51 |
| 22 | −139.24000 | 2.060 | | |
| 23 | INFINITY | 1.950 | | |
| 24 | INFINITY | 23.000 | 1.83411 | 37.30 |
| 25 | 47.31500 | 1.530 | | |
| 26 | 39.24200 | 6.230 | 1.45601 | 90.34 |
| 27 | −52.70800 | 0.500 | | |
| 28 | 160.79000 | 2.000 | 1.80106 | 34.97 |
| 29 | 28.38700 | 6.800 | 1.49702 | 81.63 |
| 30 | −75.53100 | 0.500 | | |
| 31 | 95.77500 | 4.850 | 1.45601 | 90.34 |
| 32 | −79.43300 | 0.510 | | |

TABLE 6-continued

Example 6
Focal Width: 5.20 Stop Aperture Surface: 23
Focus group: Surfaces 10 ... 17

| No. | Radius | Distance | nd | vd |
|---|---|---|---|---|
| 33 | 39.52500 | 5.650 | 1.45601 | 90.34 |
| 34 | −89.76900 | 0.520 | | |
| 35 | INFINITY | 7.600 | | |
| 36 | INFINITY | 33.000 | 1.60863 | 46.44 |
| 37 | INFINITY | 13.200 | 1.51682 | 64.17 |
| 38 | INFINITY | 0.860 | | |
| 39 | INFINITY | 1.000 | | |
| 40 | INFINITY | 0.000 | | |

Lens 1 has aspheric surface number 2.
The following are the development constants:
A: 1.120e-005 B: −8.920e-009 C: 7.780e-012

In this objective, the front group 19 is formed by the first individual lens with the two following composite lenses. The focus group 21 includes the two following composite lenses. The lens group 23 having diaphragm 25 follows the focus group 21. In this objective, as in all lens sections shown, the first object-end surface is the surface number 2. In this objective, this surface is an aspheric lens surface.

The focal lengths of front group 19, focus group 21 and lens group 23 having diaphragm 25 as well as the total focal length of the particular objective are set forth in the Table 7.

TABLE 7

Component Focal Widths

| Focal Length | Stationary Group | Focus Group | Fixed Group with Diaphragm |
|---|---|---|---|
| 39.84 | −40.205 | 131.448 | 36.380 |
| 20.10 | −32.419 | 70.705 | 37.610 |
| 13.98 | −22.176 | 78.679 | 38.442 |
| 10.01 | −616.698 | −32.552 | 29.897 |
| 7.05 | −191.321 | −31.186 | 29.897 |
| 5.20 | −10.661 | −162.152 | 31.741 |

The refractive index of 1.49702 set forth in the tables is the refractive index of fluor crown which has an abnormal dispersion.

Priority is claimed herein from German patent application 102 15 434.1, filed Apr. 8, 2002, and this application is incorporated herein by reference.

It is understood that the foregoing description is that of the preferred embodiments of the invention and that various changes and modifications may be made thereto without departing from the spirit and scope of the invention as defined in the appended claims.

What is claimed is:

1. A retrofocus objective defining an optical axis and comprising:
   a front group;
   a focus group displaceable along said optical axis;
   a fixed lens group incorporating a diaphragm; and,
   said fixed lens group being mounted adjacent said focus group and including at least two composite lenses.

2. The retrofocus objective of claim 1, wherein said lens group has a focal length in the range of 25 to 40 mm.

3. The retrofocus objective of claim 1, wherein one of said composite lenses comprises a material having an abnormal dispersion.

4. The retrofocus objective of claim 1, wherein an exit pupil is provided of more than 500 mm distant from the image plane for making available a telecentric chief beam path.

5. The retrofocus objective of claim 1, said fixed lens group incorporating a beam splitter prism for color separation and said beam splitter prism being ahead of the image plane.

6. An objective defining an optical axis and comprising:
   a front group;
   a focus group displaceable along said optical axis;
   a fixed lens group incorporating a diaphragm;
   said fixed lens group being mounted adjacent said focus group and including at least two composite lenses; and,
   wherein the TV distortion (TVV) is less than 1% and said TV distortion is obtained from the equation:

$$TVV = 50 \frac{V_{diagonal} - V_{longitudinal}}{(1 + V_{diagonal})(1 + V_{longitudinal})}$$

wherein: $V_{diagonal}$ is the distortion along the image diagonal; and, $V_{longitudinal}$ is the distortion along the image longitudinal side.

7. The objective of claim 6, wherein said objective is a retrofocus objective.

8. The retrofocus objective of claim 6, said fixed lens group incorporating a beam splitter prism for color separation and said beam splitter prism being ahead of the image plane.

9. A retrofocus objective defining an optical axis and comprising:
   a front group;
   a focus group displaceable along said optical axis;
   a fixed lens group incorporating a diaphragm; and,
   said fixed lens group being mounted adjacent said focus group and including individual lenses of positive refractive power mounted at the image side.

10. The retrofocus objective of claim 9, wherein said lens group has a focal length in the range of 25 to 40 mm.

11. The retrofocus objective of claim 9, wherein said objective further comprises a plurality of composite lenses and one of said composite lenses comprises a material having an abnormal dispersion.

12. The retrofocus objective of claim 9, said fixed lens group incorporating a beam splitter prism for color separation and said beam splitter prism being ahead of the image plane.

13. The retrofocus objective of claim 9, wherein an exit pupil is provided of more than 500 mm distant from the image plane for making available a telecentric chief beam path.

14. An objective defining an optical axis and comprising:
   a front group;
   a focus group displaceable along said optical axis;
   a fixed lens group incorporating a diaphragm;
   said fixed lens group being mounted adjacent said focus group and including individual lenses of positive refractive power mounted at the image side; and, wherein the TV distortion (TVV) is less than 1% and said TV distortion is obtained from the equation:

$$TVV = 50 \frac{V_{diagonal} - V_{longitudinal}}{(1 + V_{diagonal})(1 + V_{longitudinal})}$$

wherein: $V_{diagonal}$ is the distortion along the image diagonal; and, $V_{longitudinal}$ is the distortion along the image longitudinal side.

15. The objective of claim 14, wherein said objective is a retrofocus objective.

16. The retrofocus objective of claim 14, said fixed lens group incorporating a beam splitter prism for color separation and said beam splitter prism being ahead of the image plane.

17. A retrofocus objective defining an optical axis and comprising:
a front group;
a focus group displaceable along said optical axis;
a fixed lens group incorporating a diaphragm; and,
said fixed lens group being mounted adjacent said focus group and including at least two composite lenses and two individual positive lenses mounted at the image side.

18. The retrofocus objective of claim 17, wherein said lens group has a focal length in the range of 25 to 40 mm.

19. The retrofocus objective of claim 17, wherein one of said composite lenses comprises a material having an abnormal dispersion.

20. The retrofocus objective of claim 17, wherein an exit pupil is provided of more than 500 mm distant from the image plane for making available a telecentric chief beam path.

21. The retrofocus objective of claim 17, said fixed lens group incorporating a beam splitter prism for color separation and said beam splitter prism being ahead of the image plane.

22. An objective defining an optical axis and comprising:
a front group;
a focus group displaceable along said optical axis;
a fixed lens group incorporating a diaphragm;
said fixed lens group being mounted adjacent said focus group and including at least two composite lenses and two individual positive lenses mounted at the image side; and,
wherein the TV distortion (TVV) is less than 1% and said TV distortion is obtained from the equation:

$$TVV = 50 \frac{V_{diagonal} - V_{longitudinal}}{(1 + V_{diagonal})(1 + V_{longitudinal})}$$

wherein: $V_{diagonal}$ is the distortion along the image diagonal; and, $V_{longitudinal}$ is the distortion along the image longitudinal side.

23. The objective of claim 22, wherein said objective is a retrofocus objective.

24. The retrofocus objective of claim 22, said fixed lens group incorporating a beam splitter prism for color separation and said beam splitter prism being ahead of the image plane.

25. The retrofocus objective of claim 1, wherein said front group is a fixed front lens group and said focus group is the only moveable lens group of said objective.

* * * * *